United States Patent
Tillmann et al.

(10) Patent No.: US 12,060,375 B2
(45) Date of Patent: Aug. 13, 2024

(54) METHOD FOR THE DEHYDROGENATION OF DICHLOROSILANE

(71) Applicant: WACKER CHEMIE AG, Munich (DE)

(72) Inventors: Jan Tillmann, Munich (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 763 days.

(21) Appl. No.: 17/272,904

(22) PCT Filed: Sep. 6, 2018

(86) PCT No.: PCT/EP2018/073933
§ 371 (c)(1),
(2) Date: Mar. 2, 2021

(87) PCT Pub. No.: WO2020/048597
PCT Pub. Date: Mar. 12, 2020

(65) Prior Publication Data
US 2021/0179641 A1    Jun. 17, 2021

(51) Int. Cl.
*C07F 7/12* (2006.01)
*C01B 3/06* (2006.01)

(52) U.S. Cl.
CPC ............ *C07F 7/125* (2013.01); *C01B 3/06* (2013.01)

(58) Field of Classification Search
CPC ............ C07F 7/125; C01B 3/06; Y02E 60/36
See application file for complete search history.

(56) References Cited

U.S. PATENT DOCUMENTS

| 5,026,533 A | 6/1991 | Matthes et al. |
| 6,251,057 B1 | 6/2001 | Jung et al. |
| 6,392,077 B1 * | 5/2002 | Jung ............... C07F 7/122 556/481 |
| 7,109,367 B1 * | 9/2006 | Yoo ............... C07F 7/12 556/427 |
| 2002/0082438 A1 | 6/2002 | Jung et al. |
| 2010/0168458 A1 | 7/2010 | Mautner et al. |
| 2012/0114544 A1 | 5/2012 | Jung et al. |
| 2017/0349444 A1 | 12/2017 | Wagner et al. |

FOREIGN PATENT DOCUMENTS

| CN | 102015733 A | 4/2011 |
| DE | 10018101 A1 | 2/2001 |
| DE | 102014118658 A1 | 6/2016 |
| DE | 102015105501 A1 | 10/2016 |
| EP | 1705180 B1 | 9/2011 |
| KR | 1019880012483 A | 11/1988 |

OTHER PUBLICATIONS

Jung et al. Journal of Organometallic Chemistry 2007, 692, 3901-3906 (Year: 2007).*
Mores et al. New Aspects of Chemical Vapor Deposition Trichlorosilane 1986 (Year: 1986).*
Jung et al., J. Org. Chem., vol. 692, 2007, pp. 3901-3906.

* cited by examiner

*Primary Examiner* — Samir Shah
*Assistant Examiner* — Jordan W Taylor
(74) *Attorney, Agent, or Firm* — BROOKS KUSHMAN P.C.

(57) ABSTRACT

Dichlorosilane and trichlorosilane are dehydrogenated at elevated temperature in the presence of an ammonium or phosphonium salt as a catalyst, and a halogenated hydrocarbon or hydrogen halide. The method may be used to synthesize organochlorosilane.

14 Claims, No Drawings

METHOD FOR THE DEHYDROGENATION OF DICHLOROSILANE

CROSS REFERENCE TO RELATED APPLICATIONS

This application is the U.S. National Phase of PCT Appn. No. PCT/EP2018/073933 filed Sep. 6, 2018, the disclosure of which is incorporated in its entirety by reference herein.

BACKGROUND OF THE INVENTION

1. Field of the Invention

The present invention relates to a method for the dehydrogenation of dichlorosilane, wherein dichlorosilane is reacted in the presence of an ammonium and/or phosphonium salt either with at least one halogenated hydrocarbon or with a hydrogen halide.

2. Description of the Related Art

Organohalosilanes and especially organotrihalosilanes are used as hydrophobing agents or as starting materials for organosilanes. Organosilanes or organofunctional silanes are hybrid compounds that combine the functionality of reactive organic groups with the inorganic functionalities of alkyl silicates. They can be used as molecular bridges between organic polymers and inorganic materials. Another application of industrial importance is use as a component of silicones.

The sole ways of efficiently constructing C—Si bonds on a large scale have up to now been hydrosilylation and the Müller-Rochow process. Hydrosilylation always requires a double bond or triple bond on the organic radical and an Si—H group so that a Si—C bond can be created. The Müller-Rochow process is based on elemental silicon and simple organochlorine compounds such as MeCl. Temperatures of approx. 300° C. are necessary for the Müller-Rochow process, which limits the range of substances that can be used, since most substances decompose at such tempartures.

Some methods for preparing organosilanes are known from the literature. For example, US2002/0082438 A1 describes the synthesis of organochlorosilanes starting from trichlorosilane, dichlorosilane or dichloromethylsilane. A further starting material used is a compound of the formula $R^2R^3CHX$, where X=Cl or Br and $R^2$ is selected from $C_{1-17}$ alkyl, $C_{1-10}$ fluorinated alkyl with partial or complete fluorination, $C_{1-5}$ alkenyl, $(CH_2)_nSiMe_{3-m}Cl_m$ (where n=0-2 and m=0-3), $(CH_2)_pX$ (where p=1-9 and X=Cl or Br), or $ArCH_2X$ (where Ar=aromatic $C_{6-14}$ hydrocarbon and X=Cl or Br), and $R^3$ is selected from H, $C_{1-6}$ alkyl, $Ar(R')_q$ (where Ar=aromatic $C_{6-14}$ hydrocarbon, R=$C_{1-4}$ alkyl, halogen, alkoxy or vinyl, q=0-5). Various quaternary phosphonium halides are used as catalysts. The reaction mechanism is assumed to be a dehydrochlorination, with elimination of hydrogen chloride in all reactions.

DE10018101 A1 discloses a method for preparing organochlorosilanes starting from trichlorosilane, dichlorosilane or dichloromethylsilane. A further starting material used is a compound of the formula $R^2CH_2X$, where X=Cl or Br and $R^2$ is selected from $C_{1-17}$ alkyl, $C_{1-10}$ fluorinated alkyl with partial or complete fluorination, $C_{1-5}$ alkenyl, $(CH_2)_nSiMe_{3-m}Cl_m$ (where n=0-2 and m=0-3), $Ar(R')_q$ (where Ar=aromatic $C_{6-14}$ hydrocarbon, R=$Cl_{1-4}$ alkyl, halogen, alkoxy or vinyl, q=0-5), $(CH_2)_pX$ (where p=1-9 and X=C or Br), or $ArCH_2X$ (where Ar=aromatic $C_{6-14}$ hydrocarbon and X=Cl or Br). Tertiary amines or phosphines are used as catalysts. The reaction mechanism is assumed to be a dehydrochlorination, with elimination of hydrogen chloride in all reactions.

US2012/0114544 A1 discloses a method for preparing organochlorosilanes starting from a silane of the formula $HCl_2Si—R^1$ (where $R^1$=Cl, methyl, trichlorosilylmethyl, dichlorosilylmethyl or methyldichlorosilylmethyl). A further starting material used is a compound of the formula $R^2$—$SiCl_3$ (where $R^2$=Cl, linear $C_{2-18}$ alkyl group, isopropyl, isobutyl, tert-butyl, neopentyl, isooctyl, cyclopentyl, cyclohexyl, cycloheptyl, cyclooctyl, cyclohexenylmethyl, 2-(2-pyridyl)ethyl, 2-(4-pyridyl)ethyl, bicyclohept-2-yl, bicyclohepten-5-ylethyl, 11-acetoxyundecyl, 11-chloroundecyl, phenyl, benzyl, 2-phenylethyl, 1-naphthyl, diphenylmethyl, $CH_3(C=O)O(CH_2)_k$ (where k=2, 3, 10), $CF_3(CF_2)_l$ $CH_2CH_2$ (where l=0-12), $R^4$-Ph-$(CH_2)_m$ (where m=0, 1, 2, 3 and $R^4$=$Cl_4$ alkyl group or halogen), Cl—$(CH_2)_n$— (where n=1-12), NC—$(CH_2)_o$— (where o=2-11), $CH_2$=CH—$(CH_2)_p$— (where p=0-20), $Ar^1$—CH(Me)-$CH_2$— (where $Ar^1$=$C_{1-4}$ alkyl group, phenyl substituted with a halogen atom, biphenyl, biphenyl ether, or naphthyl), $Ar^2$—$(CH_2)_q$— (where q=3-18 and $Ar^2$=phenyl, biphenyl, biphenyl ether, naphthyl, or phenanthryl), $Cl_3Si$—$(CH_2)_r$ (where r=0-12), $Cl_3Si$—$(CH_2)_s$-$Ar^3$—$(CH_2)_s$ (where s=0 or 1 and $Ar^3$=phenyl, biphenyl, naphthyl, anthracenyl or 2,2,5,5-tetrachloro-4-trichlorosilyl-2,5-disilylcyclohexyl), or $Ar^4$—$(CH_2)_t$— (where t=0 or 1 and $Ar^4$=phenyl, biphenyl, naphthyl, or anthracenyl), trichlorosilyl ($Cl_3Si$—) or trichlorosilyloxy ($Cl_3SiO$). Quaternary phosphonium halides are used as the catalyst.

Jung et al. (J. Org. Chem. 692 (2007) 3901-3906) discloses the reaction of trichlorosilane with polychloromethanes such as chloroform and carbon tetrachloride. The quaternary phosphonium halide $Bu_4PCl$ is used as the catalyst. The reaction mechanism is assumed to be a dehydrohalogenation, with elimination of hydrogen chloride in all reactions.

EP 1705180 A1 discloses a method for synthesizing organothiomethylsilanes starting from a silane of the formula $HCl_2Si—R^1$ (where $R^1$=H, halogen or $C_{1-6}$ alkyl). A further starting material used is a compound of the formula $R^2$—S—$CH_2$—X (where X=halogen and $R^2$=$C_{1-6}$ alkyl or aryl). Quaternary ammonium or phosphonium halides are used as the catalyst. The reaction mechanism is assumed to be a dehydrohalogenation, with elimination of hydrogen chloride in all reactions.

DE102014118658 A1 describes a method for preparing perhalogenated cyclohexasilane anion starting from trichlorosilane and dichlorosilane. Quaternary ammonium or phosphonium halides are used as the catalyst. The formation of hydrogen as a by-product of the synthesis is described.

DE102015105501 A1 describes the synthesis of the following perchlorinated, anionic, silylated carbon compounds $[C(SiCl_3)_3]^-$, $[(Cl_3Si)_2C$—$C(SiCl_3)_2]^-$, $[(Cl_3C)_2SiCl_3]^-$, and $[Cl_4CSiCl_3]^-$. A chlorocarbon compound of the formula $C_mH_{4-n}Cl_n$ (where m=1 or 2 and n=2-4) is used. The other starting compound, the silane, is limited to trichlorosilane, hexachlorodisilane and perchlorinated cyclohexasilane anions. Quaternary ammonium or phosphonium halides in stoichiometric amounts are used as catalysts.

It is accordingly the object of the present invention to provide a method with which (organo)trihalosilanes or trichlorosilane can be produced economically. In addition, the method should also allow access to substances that cannot be prepared by the two existing methods.

SUMMARY OF THE INVENTION

These and other objects are achieved by a method for the dehydrogenation of dichlorosilane, wherein dichlorosilane is reacted in the presence of an ammonium and/or phosphonium salt at a temperature within a range of 70-300° C. either with (A) at least one halogenated hydrocarbon of the formula (I)

$$R^1-X \quad (I),$$

where

X=F, Cl, Br or I; and $R^1$=branched or unbranched $C_2$-$C_{20}$ alkyl radical,
  branched or unbranched $C_2$-$C_{13}$ heteroalkyl radical, the carbon skeleton containing one or more heteroatoms independently selected from N, P, S or O,
  branched or unbranched $C_1$-$C_{10}$ fluoroalkyl radical with partial or complete fluorination,
  branched or unbranched $C_2$-$C_{20}$ alkenyl radical, excluding $C_2H_{4-n}Cl_n$ when n=2-4, branched or unbranched $C_2$-$C_{20}$ alkynyl radical,
  $C_3$-$C_{14}$ cycloalkyl radical,
  $C_2$-$C_{13}$ heterocycloalkyl radical, the ring skeleton containing one or more heteroatoms independently selected from N, P, S or O,
  $C_6$-$C_{14}$ aryl radical,
  $C_5$-$C_{13}$ heteroaryl radical, the ring skeleton containing one or more heteroatoms independently selected from N, P, S or O,
  $(CH_2)_n$-Ar, where Ar=$C_6$-$C_{14}$ aryl radical and n=1-5, where all of the above-mentioned radicals may be unsubstituted or else singly or multiply substituted by halogen, $C_1$-$C_4$ alkoxy, vinyl, phenyl or $C_1$-$C_4$ alkyl, methyl radical,
  $(CH_2)_nX$, where n=1-10 and X=F, Cl, Br or I,
  $R^2$—S—$CH_2$ radical, where $R^2$=$C_1$-$C_6$ alkyl or $C_6$-$C_{14}$ aryl,
  $(CH_2)_nSiMe_{3-m}$-$Cl_m$, where n=0-5 and m=0, 1, 2, 3,
  $(CH_2)_nNH(C=O)OCH_3$, where n=1-5,
  $(CH_2)_nOCH_2$ (oxirane), where n=1-5,
  $(CH_2)_nO(C=O)(C(CH_3)=CH_2)$, where n=1-5,
  $(CH_2)_nNH_2$, where n=1-5,
  $(CH_2)_nNH(C=O)NH_2$, where n=1-5,
  $(CH_2)_nNHR$, where n=1-5, and R=cyclohexyl or $C_2H_4NH_2$;

or (B) a hydrogen halide.

DETAILED DESCRIPTION OF THE PREFERRED EMBODIMENTS

In the method according to the invention, dichlorosilane is reacted with a halogenated hydrocarbon of the formula (I) or with a hydrogen halide in the presence of an ammonium and/or phosphonium salt as catalyst. Both dichlorosilane and trichlorosilane may be used as reactants in the method according to the invention. Dichlorosilane is dehydrogenated directly by this method. Trichlorosilane, on the other hand, initially disproportionates to tetrachlorosilane and dichlorosilane (reaction scheme 1), which then undergoes dehydrogenation.

(Reaction scheme 1)

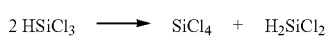

The dehydrogenation of dichlorosilane proceeds according to reaction scheme 2 below:

[Reaction scheme 2]

In a first reaction step, the non-isolable intermediate $[SiCl_3]$ is formed from dichlorosilane with elimination of hydrogen (reaction scheme 2). This anion can either react further through formal nucleophilic substitution or it can insert as dichlorosilylene. In the case of reaction with an R—Cl bond, the product is in both cases a compound R—SiCl$_3$ and in both cases a chloride ion is liberated again, which is then in turn available as a catalyst (reaction scheme 3):

[Reaction scheme 3]

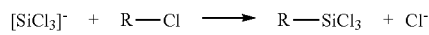

The reaction of the intermediate with a compound R—X (X=F, Br or I) results in the formation, in addition to a chloride ion, of a compound R—$SiCl_{3-n}X_n$ (n=0, 1, 2 or 3) as a result of halogen exchange at silicon, which means that a total of 4 products are obtained (reaction scheme 4):

[Reaction scheme 4]

(X = F, Br, or I: n = 0 to 3)

If the intermediate reacts for example with HCl, trichlorosilane is formed and a chloride ion is liberated (reaction scheme 5):

[Reaction scheme 5]

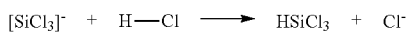

In the method according to the invention, an ammonium and/or phosphonium salt is used as catalyst. The ammonium and/or phosphonium salt may also be used in immobilized form, for example on a silicone resin, on silica, on an inorganic support or on an organic polymer. The ammonium and/or phosphonium salt may also be formed in situ from an amine or phosphine and HCl.

Quaternary ammonium halides [$R_4N$]X and phosphonium halides [$R_4P$]X or tertiary ammonium halides [$R_3NH$]X are particularly suitable, where the following applies in each case:

X=Cl, Br or I, with preference given to Cl or Br, and

R=independently selected from the group consisting of $C_1$-$C_{12}$ alkyl group, $C_1$-$C_6$ alkyl-substituted $C_6$-$C_{14}$ aryl group, and phenyl group, with preference given to ethyl, n-butyl, and phenyl.

Particularly preferred examples of such compounds are [n-$Bu_4N$]Cl, [$Et_4N$]Cl, [$Ph_4P$]Cl, and [n-$Bu_4P$]Cl.

The reactant used is either a hydrogen halide or a halogenated hydrocarbon of the formula (I).

Hydrogen halide is understood as meaning hydrogen fluoride, hydrogen chloride, hydrogen bromide or hydrogen iodide, with preference given to hydrogen chloride.

$$R^1-X \quad (I)$$

where
X=F, Cl, Br or I, and
R$^1$=branched or unbranched C$_2$-C$_{20}$ alkyl radical,
  branched or unbranched C$_2$-C$_{13}$ heteroalkyl radical, the carbon skeleton containing one or more heteroatoms independently selected from N, P, S or O,
  branched or unbranched C$_1$-C$_{10}$ fluoroalkyl radical with partial or complete fluorination,
  branched or unbranched C$_2$-C$_{20}$ alkenyl radical, excluding C$_2$H$_{4-n}$Cl$_n$ when n=2-4, branched or unbranched C$_2$-C$_{20}$ alkynyl radical,
  C$_3$-C$_{14}$ cycloalkyl radical,
  C$_2$-C$_{13}$ heterocycloalkyl radical, the ring skeleton containing one or more heteroatoms independently selected from N, P, S or O,
  C$_6$-C$_{14}$ aryl radical,
  C$_5$-C$_{13}$ heteroaryl radical, the ring skeleton containing one or more heteroatoms independently selected from N, P, S or O,
  (CH$_2$)$_n$-Ar, where Ar=C$_6$-C$_{14}$ aryl radical and n=1-5, where all of the above-mentioned radicals may be unsubstituted or else singly or multiply substituted by halogen, C$_1$-C$_4$ alkoxy, vinyl, phenyl or C$_1$-C$_4$ alkyl, methyl radical,
  (CH$_2$)$_n$X, where n=1-10 and X=F, Cl, Br or I,
  R$^2$—S—CH$_2$ radical, where R$^2$=C$_1$-C$_6$ alkyl or C$_6$-C$_{14}$ aryl,
  (CH$_2$)$_n$SiMe$_{3-m}$-Cl$_m$, where n=0-5 and m=0, 1, 2, 3,
  (CH$_2$)$_n$NH(C=O)OCH$_3$, where n=1-5,
  (CH$_2$)$_n$OCH$_2$ (oxirane), where n=1-5,
  (CH$_2$)$_n$O(C=O)(C(CH$_3$)=CH$_2$), where n=1-5,
  (CH$_2$)$_n$NH$_2$, where n=1-5,
  (CH$_2$)$_n$NH(C=O)NH$_2$, where n=1-5,
  (CH$_2$)$_n$NHR, where n=1-5, and R=cyclohexyl or C$_2$H$_4$NH$_2$.

R$^1$ in formula (I) is preferably selected from the group consisting of
  branched or unbranched C$_2$-C$_{20}$ alkyl radical,
  branched or unbranched C$_2$-C$_{13}$ heteroalkyl radical, the carbon skeleton containing one or more heteroatoms independently selected from N, P, S or O;
  branched or unbranched C$_2$-C$_{20}$ alkenyl radical, excluding C$_2$H$_{4-n}$Cl$_n$ when n=2-4, C$_3$-C$_{14}$ cycloalkyl radical,
  C$_2$-C$_{13}$ heterocycloalkyl radical, the ring skeleton containing one or more heteroatoms independently selected from N, P, S or O,
  (CH$_2$)$_n$-Ar, where Ar=C$_6$-C$_{14}$ aryl radical and n=1-3, where all of the above-mentioned radicals may be unsubstituted or else singly or multiply substituted by halogen, C$_1$-C$_4$ alkoxy, vinyl, phenyl or C$_1$-C$_4$ alkyl, methyl radical,
  (CH$_2$)$_n$X, where n=1-10 and X=F, Cl, Br or I,
  (CH$_2$)$_n$SiMe$_{3-m}$-Cl$_m$, where n=0-5 and m=0, 1, 2, 3.

Examples of such compounds are:
methyl chloride, ethyl chloride, n-propyl chloride, isopropyl chloride, n-butyl chloride, tert-butyl chloride, isobutyl chloride, sec-butyl chloride, n-pentyl chloride, n-pentyl iodide, n-pentyl bromide, n-pentyl fluoride, n-octyl chloride, 1-chlorohexadecane, 1,2-dichloroethane, 1,1-dichloropropane, 1,2-dichloropropane, 1,3-dichloropropane, monochlorobenzene, benzyl chloride, vinyl chloride, allyl chloride, allyl bromide, 1-chloro-2,4,4-trimethylpentane, hexadecyl chloride, 1-chloro-3,3,3-trifluoropropane, trichloro(chloromethyl)silane, dichloro(chloromethyl)silane, trimethyl(chloromethyl)silane, trimethyl(3-chloropropyl)silane, crotyl chloride, 4-fluorobenzyl chloride, 4-chlorobenzyl chloride, 4-methoxybenzyl chloride, 4-phenylbenzyl chloride, diphenyl-1-dichloromethane, (1-chloroethyl)benzene, cyclopentyl chloride, 1-bromo-3-chloropropane, 1,4-dichlorobutane, 1,4-bis(chloromethyl)benzene.

The method according to the invention is carried out at a temperature within a range of 70-300° C. The temperature is preferably within a range of 100-300° C., more preferably within a range of 100-180° C., and yet more preferably within a range of 150-180° C. Most preferably. the temperature is within a range of 170-180° C.

The molar ratio of hydrogen halide or halogenated hydrocarbon to dichlorosilane may be freely chosen by those skilled in the art.

In the case of hydrogen halide as the reactant, the amount of hydrogen halide added preferably corresponds to the stoichiometric amount of dichlorosilane to be converted. In the case of all other reactants, the stoichiometric amount of dichlorosilane formally used preferably corresponds to at least the amount of R$^1$—X bonds to be silylated. If not all the R$^1$—X bonds are to be silylated, the compound R$^1$—X is preferably used in a suprastoichiometric amount. The molar ratio of dichlorosilane to hydrogen halide or halogenated hydrocarbon is particularly preferably within a range from 1:1 to 1:10 based on the amount of R$^1$—X bonds.

The molar ratio of catalyst to dichlorosilane may be freely chosen by those skilled in the art.

The molar ratio is preferably within a range from 0.01:1 to 0.2:1.

The method according to the invention for the dehydrogenation of dichlorosilane allows organosilanes to be prepared in an economical manner. The method also enables dichlorosilane to be converted into trichlorosilane. On the one hand, the dichlorosilane formed as a by-product in the chlorosilane process can in principle be converted into the main product trichlorosilane in this way. Alternatively, mixtures of the two substances may be worked up such that the proportion of dichlorosilane in the mixture is lowered or the mixture is completely converted into trichlorosilane.

EXAMPLES

GC measurements were performed using an Agilent 6890N (WLD detector; columns: HP5 from Agilent: length: 30 m/diameter: 0.32 mm/film thickness: 0.25 μm; RTX-200 from Restek: length: 60 m/diameter: 0.32 mm/film thickness: 1 μm). Retention times were compared with the commercially available substances, all chemicals were used as purchased. MS measurements were carried out using a ThermoStar™ GSD 320 T2 with an iridium cathode.

Reactions Starting from Trichlorosilane

Example 1: Synthesis of Trichloromethylsilane

An autoclave was filled with HSiCl$_3$ (50 g; 0.37 mol), [n-Bu$_4$N]Cl (0.2 g; 0.7 mmol), and MeCl (9.4 g; 0.19 mol). The autoclave was heated to 140° C. for 13 h. After cooling, approx. 10 bar pressure remained in the autoclave. The product mixture consisted of 30% by weight of Cl$_3$SiMe, 50% by weight of SiCl$_4$, and 20% by weight of HSiCl$_3$, in addition to which traces of MeCl and H$_2$SiCl$_2$ were detectable. The gas evolved in the reaction was unambiguously identified as hydrogen by mass spectrometry.

Example 2: Synthesis of n-Propyltrichlorosilane

An autoclave was filled with $HSiCl_3$ (40 g; 0.30 mol), [n-Bu$_4$P]Cl (2 g; 6.8 mmol), and $MeCH_2CH_2Cl$ (10 g; 0.13 mol). The autoclave was heated to 175° C. for 13 h. After cooling, approx. 20 bar pressure remained in the autoclave. The product mixture consisted of 48% by weight of $Cl_3SiCH_2CH_2Me$, 42% by weight of $SiCl_4$, 8% by weight of $HSiCl_3$, and 2% by weight of $MeCH_2CH_2Cl$, in addition to which traces of $H_2SiCl_2$ were detectable. The gas evolved in the reaction was unambiguously identified as hydrogen by mass spectrometry.

Example 3: Synthesis of 1-chloro-3-trichlorosilylpropane and 1,3-bis(trichlorosilyl)propane An autoclave was filled with $HSiCl_3$ (36.6 g; 0.27 mol), [n-Bu$_4$P]Cl (2 g; 6.8 mmol), and Cl—$CH_2CH_2CH_2$—Cl (15.4 g; 0.13 mol). The autoclave was heated to 170° C. for 13 h. After cooling, approx. 10 bar pressure remained in the autoclave. The product mixture consisted of 25% by weight of $ClSiCH_2CH_2CH_2Cl$, 14% by weight of $ClSiCH_2CH_2CH_2SiCl$, 14% by weight of $ClCH_2CH_2CH_2Cl$, 45% by weight of $SiCl_4$, 2% by weight of $HSiCl_3$, and traces of $H_2SiCl_2$. The gas evolved in the reaction was unambiguously identified as hydrogen by mass spectrometry.

Example 4: Synthesis of 1-chloro-3-trichlorosilylpropane

An autoclave was filled with $HSiCl_3$ (18 g; 0.13 mol), [n-Bu$_4$P]Cl (2 g; 6.8 mmol), and Cl—$CH_2CH_2CH_2$—Cl (30.2 g; 0.27 mol). The autoclave was heated to 170° C. for 13 h. After cooling, approx. 5 bar pressure remained in the autoclave. The product mixture consisted of 21% by weight of $ClSiCH_2CH_2CH_2Cl$, 1% by weight of $ClSiCH_2CH_2CH_2SiCl$, 59% by weight of $ClCH_2CH_2CH_2Cl$, 19% by weight of $SiCl_4$, and traces of $H_2SiCl_2$. The gas evolved in the reaction was unambiguously identified as hydrogen by mass spectrometry.

Example 5: Synthesis of Allyltrichlorosilane

An autoclave was filled with $HSiCl_3$ (20 g; 0.15 mol), [n-Bu$_4$P]Cl (2 g; 6.8 mmol), and allyl chloride (11.2 g; 0.15 mol). The autoclave was heated to 150° C. for 13 h. After cooling, approx. 15 bar pressure remained in the autoclave. The product mixture consisted of 42% by weight of $Cl_3SiCH_2CHCH_2$, 40% by weight of $SiCl_4$, 18% by weight of $ClCH_2CHCH_2$, and traces of $H_2SiCl_2$. The gas evolved in the reaction was unambiguously identified as hydrogen by mass spectrometry.

Reactions Starting from Dichlorosilane

Example 6a) Synthesis of n-Propyltrichlorosilane

An autoclave was filled with $H_2SiCl_2$ (27 g; 0.27 mol), [n-Bu$_4$P]Cl (2.5 g; 8 mmol), and $MeCH_2CH_2Cl$ (49.5 g; 0.63 mol). The autoclave was heated to 175° C. for 13 h. After cooling, approx. 45 bar pressure remained in the autoclave. The product mixture consisted of 50% by weight of $Cl_3SiCH_2CH_2Me$, 2% by weight of $SiCl_4$, 2% by weight of $HSiCl_3$, and 46% by weight of $MeCH_2CH_2Cl$, in addition to which traces of $H_2SiCl_2$ were detectable. The gas evolved in the reaction was unambiguously identified as hydrogen by mass spectrometry.

Example 6b) Synthesis of n-Pentyltrichlorosilane

An autoclave was filled with $H_2SiCl_2$ (15 g; 0.15 mol), [n-Bu$_4$P]Cl (2.5 g; 8 mmol), and $Me(CH_2)_4Cl$ (50.5 g; 0.48 mol). The autoclave was heated to 177° C. for 13 h. After cooling, approx. 13 bar pressure remained in the autoclave. The product mixture consisted of 45% by weight of $Cl_3Si(CH_2)_4Me$ and 55% by weight of $Me(CH_2)_4Cl$, in addition to which traces of $H_2SiCl_2$ were detectable. The gas evolved in the reaction was unambiguously identified as hydrogen by mass spectrometry.

Example 6c) Synthesis of n-Pentyltrihalosilane Starting from 1-Iodopentane

An autoclave was filled with $H_2SiCl_2$ (11 g; 0.11 mol), [n-Bu$_4$P]Cl (2.0 g; 7 mmol), and $Me(CH_2)_4I$ (27.5 g; 0.14 mol). The autoclave was heated to 175° C. for 13 h. After cooling, approx. 16 bar pressure remained in the autoclave. The product mixture consisted of 80% by weight of a mixture of $Cl_{3-n}I_nSi(CH_2)_4Me$ (n=0-3) and 20% by weight of $Me(CH_2)_4I$, in addition to which traces of $H_2SiCl_2$ were detectable. The gas evolved in the reaction was unambiguously identified as hydrogen by mass spectrometry.

Example 6d) Synthesis of n-Pentyltrihalosilane Starting from 1-Bromopentane

An autoclave was filled with $H_2SiCl_2$ (26 g; 0.26 mol), [n-Bu$_4$P]Cl (2.0 g; 7 mmol), and $Me(CH_2)_4Br$ (40.0 g; 0.27 mol). The autoclave was heated to 170° C. for 13 h. After cooling, approx. 33 bar pressure remained in the autoclave. The product mixture consisted of 100% by weight of a mixture of $Cl_{3-n}Br_nSi(CH_2)_4Me$ (n=0-3), in addition to which traces of $H_2SiCl_2$ were detectable. The gas evolved in the reaction was unambiguously identified as hydrogen by mass spectrometry.

Example 6e) Synthesis of n-Pentyltrihalosilane Starting from 1-Fluoropentane An autoclave was filled with $H_2SiCl_2$ (26 g; 0.26 mol), [n-Bu$_4$P]Cl (2.0 g; 7 mmol), and $Me(CH_2)_4F$ (23.5 g; 0.26 mol). The autoclave was heated to 170° C. for 13 h. After cooling, approx. 10 bar pressure remained in the autoclave. The product mixture consisted of 100% by weight of a mixture of $Cl_{3-n}F_nSi(CH_2)_4Me$ (n=0-3), in addition to which traces of $H_2SiCl_2$ were detectable. The gas evolved in the reaction was unambiguously identified as hydrogen by mass spectrometry.

Example 7a) Reaction of Dichlorosilane with HCl

An autoclave was filled with $H_2SiCl_2$ (17 g; 0.17 mol), HCl (6.2 g; 0.17 mol), [n-Bu$_4$P]Cl (2.0 g; 7 mmol), and $HSiCl_3$ (20 g; 0.25 mol). The autoclave was heated to 180° C. for 13 h. After cooling, approx. 19 bar pressure remained in the autoclave. The product consisted of 100% by weight of $HSiCl_3$, in addition to which traces of $H_2SiCl_2$ were detectable. The gas evolved in the reaction was unambiguously identified as hydrogen by mass spectrometry, in addition to which traces of HCl were detectable.

Example 7b) Reaction of Dichlorosilane with HCl

An autoclave was filled with $H_2SiCl_2$ (17 g; 0.17 mol), HCl (6.2 g; 0.17 mol), $Bu_3N$ (1.0 g; 5 mmol), and $HSiCl_3$ (20 g; 0.15 mol). The autoclave was heated to 180° C. for 13 h. After cooling, approx. 19 bar pressure remained in the autoclave. The product consisted of 100% by weight of $HSiCl_3$, in addition to which traces of $H_2SiCl_2$ were detectable. The gas evolved in the reaction was unambiguously identified as hydrogen by mass spectrometry, in addition to which traces of HCl were detectable.

The invention claimed is:

1. A method for the dehydrogenation of dichlorosilane in which hydrogen is formed, comprising:
dehydrogenating dichlorosilane in the presence of an ammonium and/or phosphonium salt catalyst at a temperature within a range of 70-300° C., by reacting with either
(A) at least one halogenated hydrocarbon of the formula (I)

where
X is F, Cl, Br or I; and
$R^1$ is a branched or unbranched $C_2$-$C_{20}$ alkyl radical,
a branched or unbranched $C_2$-$C_{13}$ heteroalkyl radical, the carbon skeleton of which contains one or more heteroatoms independently selected from N, P, S or O,
a branched or unbranched $C_1$-$C_{10}$ fluoroalkyl radical with partial or complete fluorination,
a branched or unbranched $C_2$-$C_{20}$ alkenyl radical, excluding $C_2H_{4-n}Cl_n$ radicals where n is 2-4,
a branched or unbranched $C_2$-$C_{20}$ alkynyl radical,
a $C_3$-$C_{14}$ cycloalkyl radical,
a $C_2$-$C_{13}$ heterocycloalkyl radical, the ring skeleton of which contains one or more heteroatoms independently selected from N, P, S or O,
a $C_6$-$C_{14}$ aryl radical,
a $C_5$-$C_{13}$ heteroaryl radical, the ring skeleton of which contains one or more heteroatoms independently selected from N, P, S or O, and/or
$(CH_2)_n$-Ar, where Ar is a $C_6$-$C_{14}$ aryl radical and n is 1-5, where all of the above-mentioned radicals may be unsubstituted or else singly or multiply substituted by halogen, $C_1$-$C_4$ alkoxy, vinyl, phenyl or $C_1$-$C_4$ alkyl, radicals,
$(CH_2)_nX$, where n is 1-10 and X is F, Cl, Br or I,
$R^2$—S—$CH_2$ radicals, where $R^2$ is $C_1$-$C_6$ alkyl or $C_6$-$C_{14}$ aryl,
$(CH_2)_nSiMe_{3-m}$-$Cl_m$, where n is 0-5 and m is 0, 1, 2, 3,
$(CH_2)_nNH(C\!\!=\!\!O)OCH_3$, where n is 1-5,
$(CH_2)_nOCH_2$ (oxirane), where n is 1-5,
$(CH_2)O(C\!\!=\!\!O)(C(CH_3)\!\!=\!\!CH_2)$, where n is 1-5,
$(CH_2)_nNH_2$, where n is 1-5,
$(CH_2)_nNH(C\!\!=\!\!O)NH_2$, where n is 1-5, and
$(CH_2)_nNHR$, where n=1-5, and R is cyclohexyl or $C_2H_4NH_2$;
or with
(B) a hydrogen halide,
wherein the molar ratio of dichlorosilane to hydrogen halide or halogenated hydrocarbon is within a range from 1:1 to 1:10.

2. The method of claim 1, wherein the temperature is within the range of 100-300° C.

3. The method of claim 1, wherein the molar ratio of catalyst to dichlorosilane is within the range from 0.01:1 to 0.2:1.

4. The method of claim 1, wherein a hydrogen halide is present, and the hydrogen halide is hydrogen chloride.

5. The method of claim 1, wherein the ammonium and/or phosphonium salt is a quaternary ammonium halide $[R_4N]$X, a phosphonium halide $[R_4P]$X, or a tertiary ammonium halide $[R_3NH]$X, where X is Cl, Br or I.

6. The method of claim 5, wherein the ammonium and/or phosphonium salt is selected from the group consisting of [n-$Bu_4N$]Cl, [$Et_4N$]Cl, [$Ph_4P$]Cl, [n-$Bu_4P$]Cl, and mixtures thereof.

7. The method of claim 1, wherein $R^1$ is selected from the group consisting of branched or unbranched $C_2$-$C_{20}$ alkyl radicals,
a branched or unbranched $C_2$-$C_{13}$ heteroalkyl radical, the carbon skeleton of which contains one or more heteroatoms independently selected from N, P, S or O;
a branched or unbranched $C_2$-$C_{20}$ alkenyl radical, excluding $C_2H_{4-n}Cl_n$ when n is 2-4,
a $C_3$-$C_{14}$ cycloalkyl radical,
a $C_2$-$C_{13}$ heterocycloalkyl radical, the ring skeleton of which contains one or more heteroatoms independently selected from N, P, S or O, and
$(CH_2)_n$-Ar, where Ar is a $C_6$-$C_{14}$ aryl radical and n is 1-3, where all of the above-mentioned radicals may be unsubstituted or else singly or multiply substituted by halogen, $C_1$-$C_4$ alkoxy, vinyl, phenyl or $C_1$-$C_4$ alkyl,
$(CH_2)_nX$, where n is 1-10 and X is F, Cl, Br or I,
$(CH_2)_nSiMe_{3-m}$-$Cl_m$, where n is 0-5 and m is 0, 1, 2, 3.

8. The method of claim 1, wherein the halogenated hydrocarbon is selected from the group consisting of methyl chloride, ethyl chloride, n-propyl chloride, isopropyl chloride, n-butyl chloride, tert-butyl chloride, isobutyl chloride, sec-butyl chloride, n-pentyl chloride, n-pentyl iodide, n-pentyl bromide, n-pentyl fluoride, n-octyl chloride, 1-chlorohexadecane, 1,2-dichloroethane, 1,1-dichloropropane, 1,2-dichloropropane, 1,3-dichloropropane, monochlorobenzene, benzyl chloride, vinyl chloride, allyl chloride, allyl bromide, 1-chloro-2,4,4-trimethylpentane, hexadecyl chloride, 1-chloro-3,3,3-trifluoropropane, trichloro(chloromethyl)silane, dichloro(chloromethyl)silane, trimethyl(chloromethyl)silane, trimethyl(3-chloropropyl)silane, crotyl chloride, 4-fluorobenzyl chloride, 4-chlorobenzyl chloride, 4-methoxybenzyl chloride, 4-phenylbenzyl chloride, diphenyl-1-dichloromethane, (1-chloroethyl)benzene, cyclopentyl chloride, 1-bromo-3-chloropropane, 1,4-dichlorobutane, 1,4-bis(chloromethyl)benzene, and mixtures thereof.

9. The method of claim 1, wherein dichlorosilane is formed in situ by disproportionation of trichlorosilane.

10. The method of claim 1, wherein the method is operated continuously or batchwise.

11. The process of claim 1, wherein the amount of halogenated hydrocarbon present is a stoichiometric excess relative to dichlorosilane, up to a mol ratio of 10:1.

12. The method of claim 1, wherein dichlorosilane is reacted with hydrogen halide to form a dichlorohalosilane with formation of hydrogen.

13. The method of claim 12, wherein the hydrogen halide is hydrogen chloride, and the products are trichlorosilane and hydrogen.

14. The method of claim 1, wherein the catalyst is an ammonium salt.

* * * * *